T. E. STRAUS.
COTTON PICKER.
APPLICATION FILED JAN. 9, 1912. RENEWED OCT. 30, 1912.

1,067,283.

Patented July 15, 1913.

WITNESSES
Fenton S. Belt
Albert Popkins

INVENTOR
Theodore E. Straus
By Sturtevant & Mason
Attorneys

UNITED STATES PATENT OFFICE.

THEODORE E. STRAUS, OF BALTIMORE, MARYLAND, ASSIGNOR TO WORTHINGTON COTTON-HARVESTER COMPANY, OF BALTIMORE, MARYLAND, A CORPORATION OF DELAWARE.

COTTON-PICKER.

1,067,283.  Specification of Letters Patent.  Patented July 15, 1913.

Application filed January 9, 1912, Serial No. 670,248. Renewed October 30, 1912. Serial No. 728,732.

*To all whom it may concern:*

Be it known that I, THEODORE E. STRAUS, a citizen of the United States, residing at Baltimore, in the State of Maryland, have invented certain new and useful Improvements in Cotton-Pickers, of which the following is a description, reference being had to the accompanying drawing and to the characters of reference marked thereon.

The invention relates to new and useful improvements in cotton pickers, and more especially to cotton pickers which are provided with mechanical devices for engaging and removing the cotton boll, and a pneumatic suction passage for conveying the cotton from the mechanical pickers to the storage receptacle.

An object of the invention is to provide a cotton picker of the above type, with devices for insuring the separation or stripping of the husk of the cotton plant from the mechanical picking devices, so that the cotton may be freed of the husk, burs, leaves, small twigs, and the like, and carried in substantially clean condition to the intake passage, where it is conveyed by suction to the storage receptacle.

Figure 1:
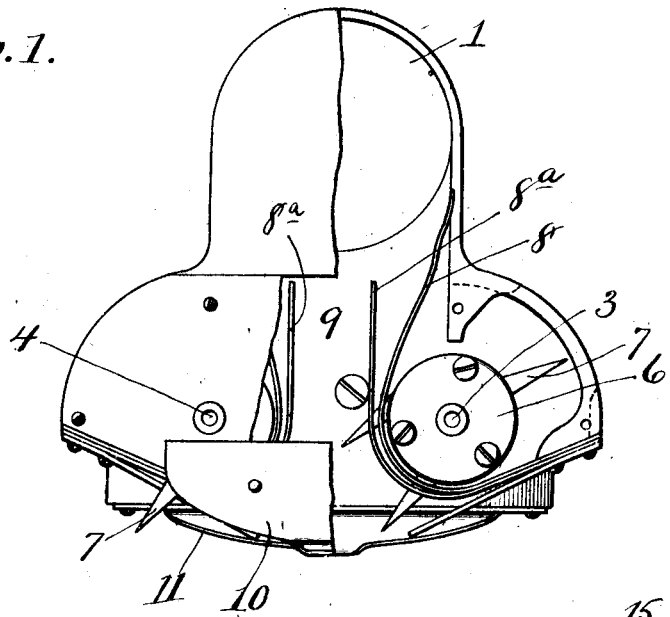
Figure 2:
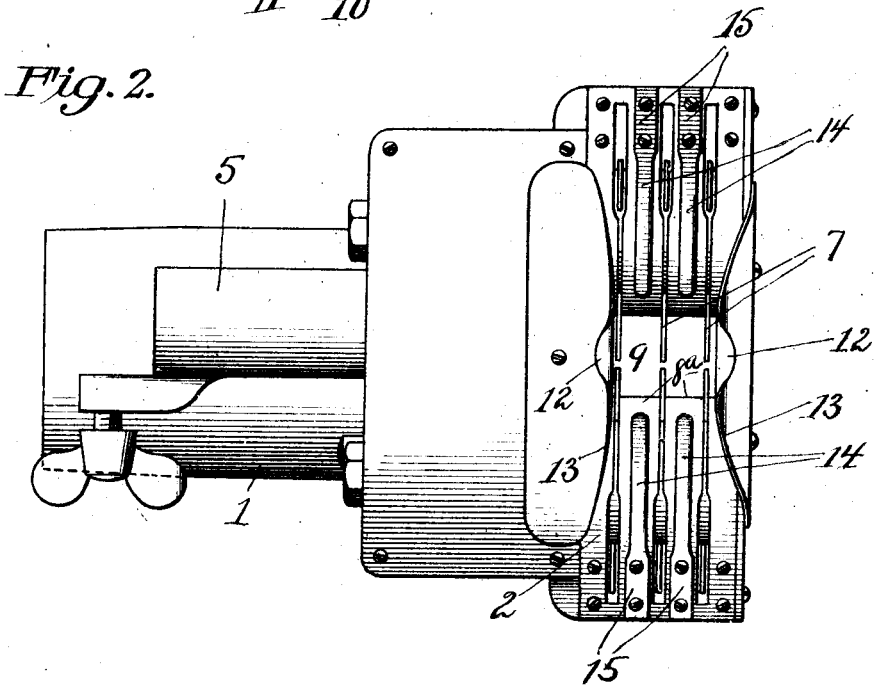

In the drawings which show by way of illustration one embodiment of the invention; Figure 1 is an end view of a cotton picking nozzle, having my improvements applied thereto, certain of the parts being broken away to show the inner mechanism; Fig. 2 is a face view of the nozzle.

In the drawings, I have shown merely the cotton picker nozzle, which includes a tube 1 adapted to be connected with a flexible tube leading to the storage receptacle, and on the end of this tube is the cotton picker head 2, which as clearly shown in Fig. 1, projects laterally from said suction tube 1. Mounted in the cotton picker head, are two shafts 3 and 4 which are driven from suitable gear mechanism operated by a flexible shaft which enters a supporting tube 5. On each of the shafts 3, 4, are carriers 6 to which are pivotally secured a plurality of sets of picker fingers 7, which sets are arranged side by side. As herein illustrated, I have provided three sets of picker fingers. These picker fingers are controlled by a stationary cam, as is common in this type of picker. Fixed stripper plates 8 extend between the sets of picker fingers. Flexible stripper plates 8ª extend between the picker fingers. These stripper plates serve to remove the cotton from the picker fingers, as the picker fingers rotate with the carrier 6. The flexible plates 8ª are substantially parallel with each other at their free ends, and form an intake passage 9 for the cotton, which is drawn by suction through the intake passage to the suction tube 1.

The two sides of the face of the nozzle or head of the cotton picker are inclined toward the center of the nozzle, as clearly shown in Fig. 1. The carriers 6 for the picker fingers are so positioned that said fingers extend beyond the inclined faces at points each side of the central plane of the nozzle. In order to deflect the husks and small twigs, I have provided the head with side plates 10 and 11, each of which is deflected inwardly over the central portion of the nozzle, and is formed with a lip 12. These side plates contract the central opening of the nozzle and form inclined ledges 13, which terminate in shoulders at the lips 12. The husks and leaves engaged by the picker fingers, will be carried against these ledges and pushed along the same until the husks and twigs are moved out of the path of the picker fingers. These inwardly projecting plates having the lips thereon, form separating devices or strippers which remove the husks, leaves and twigs from engagement by the picker fingers, and allows the cotton fiber, which we will refer to as cotton, alone to be carried by the picker fingers to the intake passage.

The above features are more fully shown, described, and claimed, in my copending application Serial No. 663,747, filed December 4th, 1911.

In order to further aid in the stripping or separating of the husks, burs, small twigs, and leaves from the cotton, I have provided a plurality of separating fingers 14. Each of these fingers is formed with a shank 15, which is attached by suitable screws, to the outer edges of the face of the nozzle, and said fingers project toward the central portion of the nozzle. The fingers as herein shown, are substantially straight, but are inclined so that the free ends of the fingers lie substantially in the same plane as the inclined ledge 13 of the side plates, for the nozzle. These fingers are located between each set of picker fingers. The width of the fingers is so proportioned as to leave ample space for the cotton which is engaged by the picker fingers to be carried between the stripper or separating fingers while the husks, leaves and twigs, will engage said fingers owing to the more rigid and non-yielding construction of the husks etc., and therefore, these husks will be slid along the fingers toward their free ends, and on to the ledges 13 of the side plates where they strike against the shoulders formed by the lip 12, and are released from the picker fingers. These stripper fingers are preferably so positioned relative to the picker fingers, that the path of movement of the extreme point of the picker fingers is within the extreme point of the stripper fingers, so that any hard particles engaged by the picker fingers, and slid along the stripper fingers will be entirely dislodged from the picker fingers.

From the above construction, it will be apparent that I have provided means for effectively separating or removing the husks, twigs, and leaves, from the cotton, which means does not in any way interfere with the engagement of the cotton by the picker fingers, and the carrying of the cotton to the intake passage of the picker. It is to be noted that the active region of the picker fingers on each carrier, is at one side of the central portion of the nozzle, and, therefore, the active picking region is also at one side of the center of the nozzle. In other words, if the central portion of the nozzle is presented to the plant, there will be no picking action, but only as first one side and then the other of the nozzle is brought into contact with the plant, will the cotton be engaged by the mechanical picking means, and the separating devices above described will, therefore, effectually prevent the husks, burs, twigs and leaves from being carried into the nozzle by the picker fingers, which insures not only a clean picking of cotton, but also prevents the stopping of the suction passage by these hard objectionable parts.

While I have described a plurality of sets of mechanical picking devices, it is obvious from certain aspects of the invention, that a single set may be used, the essential feature being the separating fingers located on each side of the mechanical picking devices.

It is obvious that minor changes in the details of construction may be made, without departing from the spirit of the invention.

Having thus described my invention, what I claim as new and desire to secure by Letters Patent, is:—

1. A cotton picker including in combination, a nozzle having side walls and an intake throat, a carrier located between said side walls and at one side of said intake throat, mechanical picking devices mounted on said carrier for engaging the cotton of the boll and carrying said cotton into said intake throat, and a relatively stationary separating device attached to said nozzle and located between said side walls, said separating device being disposed between the mechanical picking devices and outside of the throat and extending over and in front of the carrier for stripping the husks and twigs from the mechanical picking devices.

2. A cotton picker including in combination, a nozzle having side walls and an intake throat, a carrier located between said side walls and at one side of said intake throat, mechanical picking devices mounted on said carrier for engaging the cotton of the boll and carrying said cotton into said intake throat, a relatively stationary separating device attached to said nozzle and located between said side walls, said separating device being disposed between the mechanical picking devices and outside of the throat and extending over and in front of the carrier for stripping the husks and twigs from the mechanical picking devices, and independent means extending into said throat for stripping the cotton from said mechanical picking devices.

3. A cotton picker including in combination, a suction nozzle having an intake throat, a rotary carrier located at one side of said throat, picking fingers mounted on said carrier for engaging the cotton of the boll and carrying the same into said intake throat, and relatively stationary separating devices attached to the nozzle at the same side of the throat as the carrier, said devices being located at each side of each of the picking fingers and outside of said throat and extending over and in front of the carrier for stripping the husks and twigs from the picking fingers.

4. A cotton picker including in combination, a suction nozzle having an intake throat, a rotary carrier located at one side of said throat, picking fingers mounted on said carrier for engaging the cotton of the boll and carrying the same into said intake throat, relatively stationary separating devices located at each side of each of the picking fingers and outside of said throat for stripping the husks and twigs from the picking fingers, and relatively stationary independent means in said throat for stripping the cotton from said picking fingers.

5. A cotton picker including in combination, a suction nozzle having an intake throat, rotating carriers located upon each side of said throat, each of said carriers having a plurality of sets of picking fingers for engaging the cotton of the boll and carrying the same into said intake throat, and relatively stationary separating devices for each of said carriers, said separating devices being located at each side of each set of picking fingers and outside of said throat and extending over and in front of the respective carriers for stripping the husks and twigs from said fingers.

6. A cotton picker including in combination a suction nozzle having an intake throat, rotating carriers located upon each side of said throat, each of said carriers having a plurality of sets of picking fingers for engaging the cotton of the boll and carrying the same into said intake throat, relatively stationary separating devices for each of said carriers, said separating devices being located at each side of each set of picking fingers, and outside of said throat for stripping the husks and twigs from said fingers, and relatively stationary stripping devices secured to said nozzle at the outer face thereof, and extending about each of said carriers into said throat for stripping the cotton from the picking fingers.

7. A cotton picker including in combination a suction nozzle having an intake throat, said nozzle being provided with picking faces inclined relative to each other so as to meet in a line located in a plane passing centrally through said throat, a rotating carrier at each side of said throat, each of said carriers having a plurality of sets of picking fingers projecting beyond the picking faces of said nozzles for engaging the cotton of the boll and carrying the same into said intake throat, and relatively stationary separating devices, located at each side of each set of picking fingers on each carrier for stripping the husks and twigs from said fingers, and relatively stationary means extending into said throat for stripping the cotton from said fingers.

8. A cotton picker including in combination, a nozzle having a central suction intake passage, rotating mechanical picking devices located at each side of said suction passage, each of said devices including a plurality of sets of picker fingers, inwardly projecting plates located centrally of the nozzle and having inclined ledges for separating the husks from the cotton, and stripper fingers located between the sets of picker fingers for stripping the husks and twigs from the picker fingers.

9. A cotton picker including in combination, a nozzle having a central suction intake passage, rotating mechanical picking devices located at each side of said suction passage, each of said devices including a plurality of sets of picker fingers, inwardly projecting plates located centrally of the nozzle and having inclined ledges for separating the husks from the cotton, and stripper fingers located between the sets of picker fingers for stripping the husks and twigs from the picker fingers, and independent means for stripping the cotton from the picker fingers.

10. A cotton picker including in combination, a suction nozzle having an intake throat, said nozzle being provided with picking faces inclined relative to each other and outwardly from the nozzle, so as to meet in a line located in a plane passing centrally through said throat, a rotating carrier at each side of said throat, each of said carriers having a plurality of sets of picking fingers projecting beyond the picking faces of said nozzles for engaging the cotton of the boll, and carrying the same into said intake throat, and relatively stationary separating devices coöperating with said picking fingers at points outside of said throat for stripping the husks and twigs from said picking fingers.

11. A cotton picker including in combination, a suction nozzle having an intake throat, said nozzle being provided with picking faces inclined relative to each other and outwardly from the nozzle so as to meet in a line located in a plane passing centrally through said throat, mechanical picking devices at each side of said throat for engaging the cotton of the boll and carrying said cotton into said intake throat, and relatively stationary separating devices located at each side of said mechanical picking devices and outside of said throat and extending over and in front of the respective mechanical picking devices for stripping the husks and twigs from said mechanical picking devices.

12. A cotton picker including in combination, a suction nozzle having an intake throat, a carrier located at one side of said intake throat, mechanical picking devices mounted on said carrier for engaging the cotton of the boll and carrying said cotton into said intake throat, a relatively stationary separating device attached to the nozzle and located between the mechanical picking devices, said separating device being disposed entirely at one side of the throat, whereby the husks and twigs are stripped from the mechanical picking devices at a point out of range of the suction through the intake throat.

13. A cotton picker including in combination, a nozzle having side walls and an intake throat, a carrier located between said side walls and at one side of said intake throat, mechanical picking devices mounted on said carrier for engaging the cotton on the boll and carrying said cotton into said intake throat, a relatively stationary separating device attached to the nozzle and located between said side walls, said separating device being disposed between the mechanical picking devices and outside of the throat and extending over and in front of the carrier, said separating device having its end adjacent the throat free and terminating at a point adjacent the path of travel of the outer tips of the mechanical picking devices, whereby said separating device strips the twigs and husks from the picking devices and allows the picking devices to carry the cotton past the end of the separating device.

14. A cotton picker including in combination, a nozzle having side walls and an intake throat, a carrier located between said side walls and at one side of said intake throat, a plurality of sets of mechanical picking fingers mounted on said carrier, relatively stationary separating devices located at each side of each set of mechanical picking devices, said separating devices being attached to the nozzle at the same side of the throat as the carrier and projecting over and in front of the carrier, said separating devices having their ends adjacent the throat free and terminating at points adjacent the path of travel of the outer ends of the picking fingers, whereby the husks and twigs are stripped from the fingers and the cotton impaled on the fingers may be carried from the ends of the stripping devices into said intake throat.

In testimony whereof I affix my signature, in presence of two witnesses.

THEODORE E. STRAUS

Witnesses:
  WM. E. STRAUS,
  E. G. MASON.